Patented Nov. 6, 1928.

1,690,752

UNITED STATES PATENT OFFICE.

SWIGEL POSTERNAK, OF CHENE-BOUGERIES, NEAR GENEVA, SWITZERLAND, ASSIGNOR TO THE FIRM SOCIETY OF CHEMICAL INDUSTRY IN BASLE, OF BASEL, SWITZERLAND.

PHOSPHORUS COMPOUND FROM ANIMAL PROTEIDS AND PROCESS FOR THE MANUFACTURE THEREOF.

No Drawing. Application filed March 21, 1927, Serial No. 177,220, and in Switzerland March 31, 1926.

The present invention relates to new compounds containing phosphorus and iron from the proteids of egg yolk, said compounds being useful in therapeutics, for instance as tonics, and it comprises the new compounds themselves as well as the process of obtaining the same.

Since Miescher (Med. Chem. Untersuchungen Hoppe Seylers, Fasc. 4, 1871, page 502) observed the existence of organically combined phosphorus in egg yolk which has been extracted with alcohol and ether (he was of the opinion that he was here dealing with true nucleins), several investigators have sought to isolate the compound containing phosphorus in a condition more or less free from albumin. Thus Bunge's Haematogen (Zeitschr. f. physiol. Chemie, vol. 9, page 49, 1885) is a substance which contains 5.19 per cent of phosphorus and 0.29 per cent of iron as compared with 6.7 to 7.8 per cent of phosphorus in Miescher's preparation. Altmann (Archiv. für Anat. und Phys. 1889) sought to separate according to his general method of obtaining nucleic acids a similar acid from egg yolk. It contained about 7 per cent of phosphorus. According to Milroy (Zeitschr. f. physiol. Chemie, vol. 22, page 307) this product was not a true nucleic acid, for it did not yield xanthine bases by hydrolysis with mineral acid, showed a pronounced Biuret reaction but no Millon's reaction and contained from 7,51 to 7,94 per cent of phosphorus. In the year 1901 Levene and Alsberg (Zeitschr. f. physiol. Chemie, vol. 31, 1901, page 543) described their avivitellinic acid obtained by treatment of purified vitellin with cold ammonia of 25 per cent strength, neutralization with acetic acid, separation of albumins with aid of picric acid and precipitation of the avivitellinic acid with alcohol. The substance purified by resolution, had a mean content of 9,88 per cent of phosphorus and 0,57 per cent of iron. It gave the Biuret reaction and the Millon's reaction. After hydrolysis 17,8 per cent of the total nitrogen was in the form of arginine and 3 per cent in the form of histidine. 5 years later Hugounenq and Morel (Comptes rendus 140, page 1065, (1905)) described a preparation obtained according to Bunge but apparently much more purified (the conditions of operation were not given) containing 8.7 per cent of phosphorus and 0.45 per cent of iron. From these publications in literature it is clear that there is no process for isolating with certainty in chemically pure form the prosthetic phosphorus group of the proteids of yolk of egg.

It has now been found that in egg yolk there is not only one prosthetic phosphorus group but three, which may be distinguished by the letters $\alpha$, $\beta$ and $\gamma$.

The present invention relates to a process for obtaining mixtures of these phosphorus nuclei, free from admixed albumin degradation products, in the form of free acids or of their salts. The process is based on the following observations:—

1. The defatted and coagulated egg yolk cannot be digested by trypsin; on the other hand it is capable of digestion after having been opened up by means of pepsin in hydrochloric acid.

2. The action of the pepsin and hydrochloric acid may be arrested at any moment by neutralizing the hydrochloric acid with the corresponding quantity of alkali carbonate or substituting acetic acid for it by means of alkali acetate. The more or less profoundly digested proteids are thus precipitated.

3. The trypsin digestion splits off the three nuclei containing phosphorus, which may be isolated in form of mixtures of the free acids or their salts.

4. The mixture of the phosphorus nuclei $\alpha+\beta$ may be separated from the phosphorus nucleus $\gamma$ by the insolubility of the calcium salts of the former in water.

Example 1.

Egg yolk is extracted with boiling alcohol, dried and finely ground; 10 kilos of it are suspended in 500 litres of water and there are added 2,8 kilos of concentrated hydrochloric acid and 100 grams of pepsin or of a corresponding quantity of hyrochloric acid extract of the mucous membrane of the stomach of a pig; the mixture is heated with constant stirring to 37–40° C. until the egg yolk has passed into solution. After about 10 hours 3,8 kilos of crystallized sodium acetate or 1½ kilos of crystallized sodium carbonate and 1 kilo of glacial acetic acid are added. After filtration, preferably in a filter press, the solid matter is washed with water and taken up with a solution of 1,200 grams of anhydrous sodium carbonate in 40 liters of water, 100 grams of finely minced pancreas are added and the mixture is digested for 24–48 hours at 40° C. It is then slightly acidified with acetic acid, filtered and to the filtrate is added calcium chloride or calcium acetate and an equal volume of alcohol to produce a precipitate. The latter is filtered, washed with alcohol and dried. In this manner there is obtained a mixture of the calcium salts of the phosphorus nuclei $\alpha + \beta + \gamma$ constituting a yellowish white, tasteless powder, which is only in part soluble in water and contains about 10,5 per cent of phosphorus, 1 per cent of iron and 9–10 per cent of calcium.

Example 2.

The filtered tryptic digestion liquid as obtained according to Example 1 is precipitated with calcium chloride or calcium acetate without admixture of alcohol. The precipitate is then filtered, washed and dried. It constitutes a mixture of the calcium salts of the phosphorus nuclei $\alpha$ and $\beta$ and is a yellowish white, tasteless powder, which contains 11 per cent of phosphorus, 1.25 per cent of iron and 10 per cent of calcium.

Example 3.

The mixture digested with pancreas, obtained as described in Example 1, is acidified with acetic acid, filtered from undissolved matter and mixed with lead acetate solution so long as a precipitate is produced. The lead precipitate is filtered, washed with water and stirred with a sodium carbonate solution of 20 per cent strength until the mixture shows a feeble red on phenolphthalein paper. The phosphorus compounds pass into solution in the form of sodium salts while the lead remains undissolved in the form of carbonate. The solution of the sodium salts is strongly concentrated in a vacuum, and then mixed with alcohol to produce a precipitate which is subsequently dried in a vacuum. There are obtained in this manner the sodium salts of the three nuclei containing phosphorus derived from the yolk of egg in the form of a yellowish powder soluble in water.

Example 4.

The solution of the sodium salts obtained as described in Example 3. is mixed with a solution of calcium chloride or calcium acetate and precipitation is completed by adding an equal volume of alcohol. In this manner there are obtained the same calcium salts as are produced in Example 1.

Example 5.

The solution of the sodium salts of the three phosphorus nuclei as obtained according to Example 3 is precipitated with calcium chloride or calcium acetate and the precipitate filtered, washed and dried. The same mixture of the calcium salts of the phosphorus nuclei $\alpha$ and $\beta$ is obtained as described in Example 2.

Example 6.

The solution of the sodium salts, obtained as described in Example 3, is poured into alcohol containing 3 per cent of hydrochloric acid; the precipitate thus produced is filtered, thoroughly washed with alcohol and dried. The product contains the phosphorus containing nuclei of egg yolk in the free condition. It is a white powder which is only partially soluble in water and contains about 11.8 per cent of phosphorus and about 1.1 per cent of iron; with alkalies it yields soluble salts; with soluble salts of alkali earth and heavy metal salts it gives salts which are in some cases soluble and in others insoluble. To cold acids it is very stable, but unstable to alkalies. It yields a pronounced Biuret reaction and a Molisch reaction but no Millon's reaction.

It is obvious that instead of sodium carbonate, potassium carbonate may be used in the trypsin digestion and in the pepsin digestion another mineral acid may be substituted for the hydrochloric acid. Instead of lead salt another heavy metal salt, such as a salt of copper, mercury or iron may be used. When converting the heavy metal salt into the alkali salt other alkali compounds may be used instead of alkali carbonate, provided their anions form sparingly soluble compounds with the heavy metal in question.

What I claim is:—

1. A process for obtaining mixtures of the nuclei containing phosphorus and iron of the proteids contained in egg yolk by first subjecting the defatted egg yolk in the presence of a mineral acid to pepsin digestion, arresting this digestion at a desired period of time by materially diminishing the acidity of the mixture, filtering the precipitate thus produced and subjecting it to trypsin digestion in feebly alkaline medium, then acidifying the digestion liquor thus obtained, filtering and isolating from the filtrate by treatment with soluble metal compounds the mixture of the metal salts of the three phosphorus nuclei.

2. A process for obtaining mixtures of the nuclei containing phosphorus and iron of the proteids contained in egg yolk by first subjecting the defatted egg yolk in the presence of a mineral acid to pepsin digestion, arresting this digestion at a desired period of time by materially diminishing the acidity of the mixture, filtering the precipitate thus produced and subjecting it to trypsin digestion in feebly alkaline medium, then acidifying the digestion liquor thus obtained, filtering and isolating from the filtrate by treatment with soluble heavy metal compounds the mixture of the corresponding heavy metal salts of the three phosphorus nuclei.

3. A process of obtaining mixtures of the nuclei containing phosphorus and iron of the proteids contained in egg yolk by first subjecting the defatted egg yolk in the presence of a mineral acid to pepsin digestion, arresting this digestion at a desired period of time by materially diminishing the acidity of the mixture, filtering the precipitate thus produced and subjecting it to trypsin digestion in feebly alkaline medium, then acidifying the digestion liquor thus obtained, filtering and isolating from the filtrate by treatment with soluble heavy metal compounds the mixture of the corresponding heavy metal salts of the three phosphorus nuclei, decomposing the latter with alkali compounds whose anions yield insoluble compounds with the corresponding heavy metal and thus isolating the mixture of the alkali salts of the three phosphorus nuclei.

4. A process for obtaining mixtures of the nuclei containing phosphorus and iron of the proteids contained in egg yolk by first subjecting the defatted egg yolk in the presence of a mineral acid to pepsin digestion, arresting this digestion at a desired period of time by materially diminishing the acidity of the mixture, filtering the precipitate thus produced and subjecting it to trypsin digestion in feebly alkaline medium, then acidifying the digestion liquor thus obtained, filtering and isolating from the filtrate by treatment with soluble heavy metal compounds the mixture of the corresponding heavy metal salts of the three phosphorus nuclei, decomposing the latter with alkali compounds whose anions yield insoluble compounds with the corresponding heavy metal, thus isolated the mixture of the alkali salts of the three phosphorus nuclei, which latter is then traced with acidulated alcohol, whereby the mixture of the three phosphorus nuclei is obained in the form of the free acids.

5. A process for obtaining mixtures of the nuclei containing phosphorus and iron of the proteids contained in egg yolk by first subjecting the defatted egg yoke in the presence of a mineral acid to pepsin digestion, arresting this digestion at a desired period of time by materially diminishing the acidity of the mixture, filtering the precipitate thus produced and subjecting it to trypsin digestion in feebly alkaline medium, then acidifying the digestion liquor thus obtained, filtering and isolating from the filtrate by treatment with soluble heavy metal compounds the mixture of the corresponding heavy metal salts of the three phosphorus nuclei, decomposing the latter with alkali compounds whose anions yield insoluble compounds with the corresponding heavy metal, thus isolating the mixture of the alkali salts of the three phosphorus nuclei, whereupon these latter are treated with soluble alkali earth metal salts, thereby eliminating the mixture of the alkali earth metal salts of the phosphorus nuclei $\alpha$ and $\beta$.

6. A process for obtaining mixtures of the nuclei containing phosphorus and iron of the proteids contained in egg yolk by first subjecting the defatted egg yolk in the presence of a mineral acid to pepsin digestion, arresting this digestion at a desired period of time by materially diminishing the acidity of the mixture, filtering the precipitate thus produced and subjecting it to trypsin digestion in feebly alkaline medium, then acidifying the digestion liquor thus obtained, filtering and isolating from the filtrate by treatment with soluble alkali earth metal salts and alcohol the mixture of the corresponding alkali earth metal salts of the three phosphorus nuclei.

7. A process for obtaining mixtures of the nuclei containing phosphorus and iron of the proteids contained in egg yolk by first subjecting the defatted egg yolk in the presence of a mineral acid to pepsin digestion, arresting this digestion at a desired period of time by materially diminishing the acidity of the mixture, filtering the precipitate thus produced and subjecting it to trypsin digestion in feebly alkaline medium, then acidifying the digestion liquor thus obtained, filtering and isolating from the filtrate by treatment with soluble alkali earth metal salts the mixture of the corresponding alkali earth metal salts of the phosphorus nuclei $\alpha$ and $\beta$.

8. The herein described mixture of the two phosphorus nuclei $\alpha$ and $\beta$ obtained from the proteids of egg yolk, which mixture, in form of the calcium salt, constitutes a yellowish white, tasteless powder containing about 11 per cent of phosphorus, 1.25 per cent of iron and 10 per cent of calcium, and being useful for therapeutic purposes, for instance as a tonic.

9. The herein described mixture containing the three phosphorus nuclei $\alpha$, $\beta$ and $\gamma$ obtained from the proteids of egg yoke, in the free state, said mixture constituting a white powder incompletely soluble in water, which contains about 11.8 per cent of phosphorus and about 1.1 per cent of iron, and which yields with alkali metal compounds soluble salts, with soluble alkali earth metal and heavy metal salts partly soluble, partly insoluble compounds, and which is fairly stable towards acids, rather unstable towards alkali metal hydroxides and yields a pronounced Biuret reaction and a Molisch reaction, but no Millions's reaction.

10. The herein described mixture of the calcium salts of the three phosphorus nuclei $\alpha$, $\beta$ and $\gamma$, obtained from the proteids of egg yolk, which mixture constitutes a yellowish white, tasteless powder, being but partly soluble in water and containing about 10.5 per cent of phosphorus, 1 per cent of iron and about 9–10 per cent of calcium, and is useful for therapeutic purposes, for instance as a tonic.

In witness whereof I have hereunto signed my name this 7th day of March, 1927.

SWIGEL POSTERNAK.